Patented Feb. 19, 1952

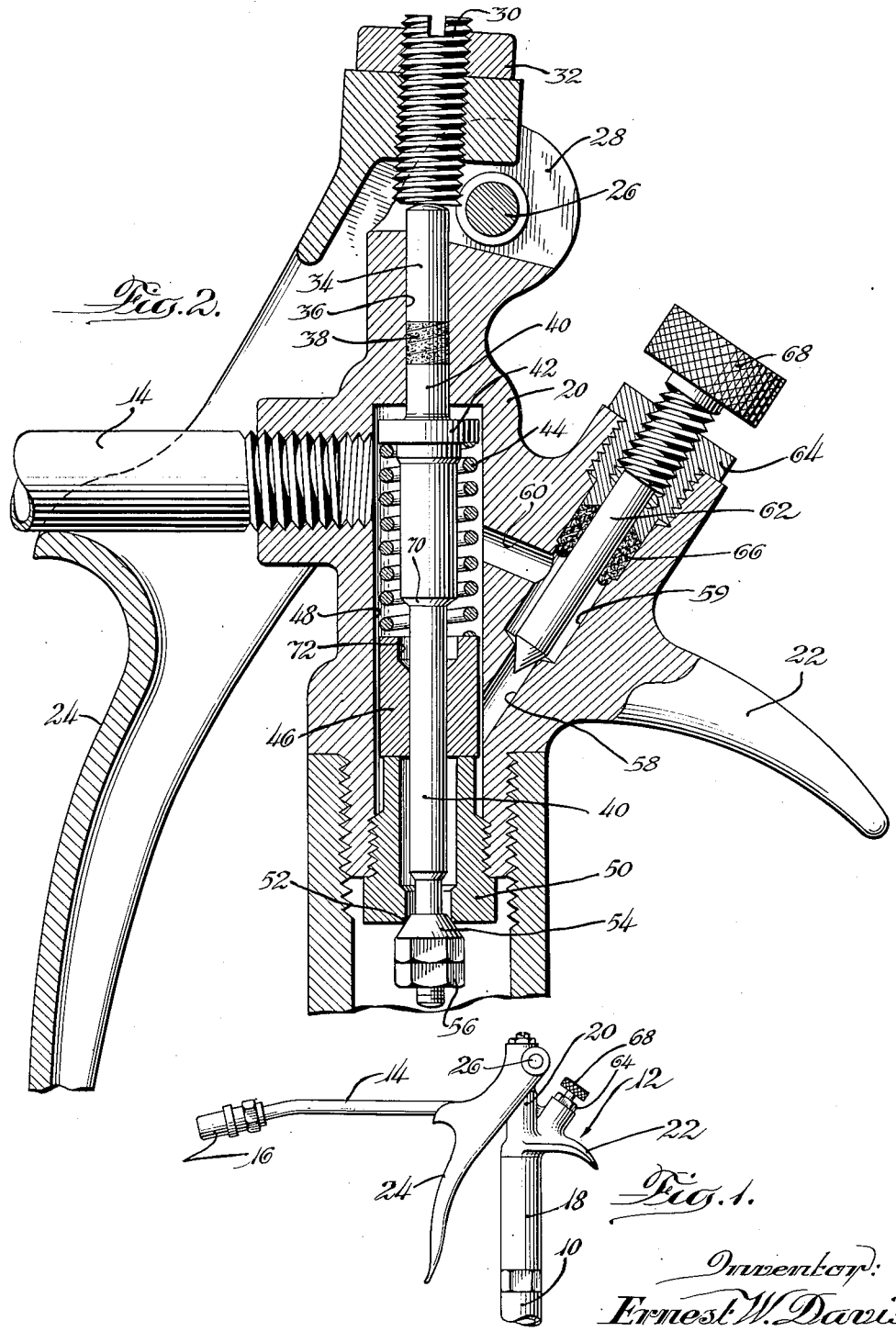

2,586,456

UNITED STATES PATENT OFFICE 2,586,456

MANUALLY OPERATED CONTROL VALVE FOR LUBRICATING APPARATUS

Ernest W. Davis, River Forest, Ill.

Application June 14, 1947, Serial No. 754,642

7 Claims. (Cl. 222—335)

My invention relates generally to lubricating apparatus, and more particularly to improvements in manually operated control valves generally used in high pressure lubricating apparatus to control the flow of lubricant from a source under pressure to bearings or other parts requiring lubrication.

In the use of control valves for this purpose, the operator frequently experiences difficulty in so controlling the flow that an excess of lubricant is not supplied to the bearings. It is difficult for the operator to gauge the rate of flow of the lubricant, and to overcome this difficulty the present invention provides means whereby the operator may supply measured charges of lubricant with each operation of the control valve.

It is thus the primary object of my invention to provide an improved control valve for lubricating apparatus, whereby measured charges of lubricant may be supplied to the parts to be lubricated.

A further object is to provide an improved manually operated control valve which is simple in construction, is conveniently operated, which may be economically manufactured, and which will have a long useful life.

Other objects will appear from the following description, reference being had to the accompanying drawings, in which:

Fig. 1 is a side elevational view of the improved control valve; and

Fig. 2 is a central vertical sectional view of the operating parts thereof.

As is common in high pressure lubrication, a lubricant compressor has a discharge hose 10 (Fig. 1) which is connected to a control valve 12 by which the flow through a nozzle 14 may be controlled. The nozzle 14 terminates in a coupler 16 which is arranged for quick detachable lubricant-tight successive connection to a plurality of fittings mounted on bearings to be lubricated.

The improved control valve comprises a handle tube 18 threaded on a body 20. The body includes a rearwardly projecting portion 22 adapted to rest upon the operator's hand between his thumb and forefinger. A hand lever 24 is in convenient position for engagement by the fingers of the operator, this lever being pivoted on a stud 26 which is suitably secured in the lever 24, and extends through the upper end 28 of the valve body 20. An adjusting screw 30 is threaded in the lever 24, being locked in adjusted position by a lock nut 32, the lower end of the screw 30 engaging the upper end 34 of a valve stem. The valve stem is guided in a suitable bore 36 in the body 20, and leakage of lubricant past the stem is prevented by a suitable packing 38 wound about a reduced diameter portion of the stem. The upper end portion 34 of the valve stem may, if desired, be threaded to the lower portion 40 thereof, or these parts may be made integral.

The lower portion 40 of the valve stem has a flange 42 formed thereon, the lower surface of which forms a seat for a compression coil spring 44, the lower end of the coil spring 44 resting against a piston 46 which is movable in a cylinder or bore 48, having considerable clearance with respect thereto. A valve seat bushing 50 is threaded in the lower end of the bore 48, and its upper end forms a downward limit stop for the piston 46. The valve seat 52 of the bushing 50 is adapted to be closed by a conical valve member 54 threaded on the lower end of valve stem 40, and secured in adjusted position thereon by a lock nut 56. The upper end of the bore 48 communicates with the nozzle 14.

A bypass is provided by communicating passageways 58, 59, and 60 in the body 20, the shoulder between the passageways 58 and 59 forming a seat for a needle valve 62. The latter is threaded in a packing gland 64 which is threaded in the body 20, leakage being prevented by a suitable packing 66. The needle valve 62 has a manually operable knurled thumbpiece 68 and the threads formed on this needle valve 62 are preferably double so as to make it possible quickly to open and close the valve.

With the control valve connected to a suitable source of lubricant under high pressure, and assuming that the coupler 16 has been connected to a suitable lubricant receiving fitting, the operator, by swinging the lever 24 towards the handle 18, will depress the valve stem 40 downwardly to move valve 54 from its seat 52. Lubricant under pressure will therefore rapidly flow through the bushing 50 and exert pressure on the lower surface of the piston 46, moving the latter rapidly upwardly until such movement is limited by engagement of a stop shoulder 70 with the lower end of a bore 72 formed in the piston 46. The bore 72, together with the enlarged portion of the stem 40 adjacent the shoulder 70, forms a dashpot to cushion and reduce the impact of the piston 46 against the shoulder 70 of the stem 40. As the piston 46 engages the shoulder 70, it will move the valve stem 40 and all parts connected therewith upwardly, again closing the valve 54 against its seat 52. In the course of its upward movement, the piston 46 displaces a predetermined quantity of lubricant which is discharged through the nozzle 14 and coupler 16, and thus supplied to the bearing. As soon as the valve 54 is again closed, the spring 44 is effective to return the piston 46 to the position in which it is shown in Fig. 2, such return movement being possible because of the substantial clearance between the piston 46 and its cylinder 48. The clearance is preferably such that with lubricant of the viscosity ordinarily used, the piston will return to its normal position in a very short time, such as a second or a second and a half, and the apparatus will thereupon be reconditioned for operation.

When the piston 46 strikes the shoulder 70, the force applied is sufficient to swing the lever 24 clockwise even though it is being fairly tightly gripped by the operator.

When a continuous supply of lubricant is to be discharged, as when filling a container, the needle valve 62 is opened and the operator thereafter opens the valve 54 and holds it open until the required amount of lubricant has been discharged.

From the foregoing, it will appear that the control valve of the invention is very simple in construction and that it may be used to advantage in metering predetermined quantities of lubricant to a bearing by operating the control valve the required number of times. The metering is quite accurate despite the fact that it will be apparent that as the piston 46 moves upwardly, some lubricant may leak through the clearance space between this piston and its bore 48. Such leakage will be substantially the same for each operation of the piston, and in any event is not very large because of the rapidity with which the piston 46 is forced upwardly when the valve 54 is opened.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a control valve for lubricating apparatus, the combination of a valve body having a valve seat, a valve which opens in direction opposite the lubricant flow, a manually operable trigger handle to open said valve, a bore, a piston reciprocable in said bore, a spring urging said piston to move in a direction opposite to the lubricant flow, means for opening said valve admitting lubricant under pressure to the cylinder bore, said means including a valve stem having a stop thereon, said piston having substantial clearance with respect to said bore so as to permit said spring to return the piston to normal position when the valve is closed, and dashpot means to absorb the impact of the piston against the stop formed on the valve stem.

2. In a control valve for lubricating apparatus, the combination of a valve body having a valve seat, a valve which opens in the direction opposite the lubricant flow, a manually operable trigger handle to open said valve, a bore, a piston reciprocable in said bore, a spring urging said piston to move in a direction opposite to the lubricant flow, means for opening said valve admitting lubricant under pressure to the cylinder bore, said means including a valve stem having a stop therein, said piston having substantial clearance with respect to said bore so as to permit said spring to return the piston to normal position when the valve is closed, dashpot means to absorb the impact of the piston against the stop formed on the valve stem, and a manually adjustable valve controlled passageway bypassing said piston to permit flow of lubricant through the control valve without operating the piston.

3. In a control valve for lubricating apparatus comprising a body having an inlet port for connection to a source of lubricant under pressure and having an outlet port, said body having a cylindrical bore therein communicating with the inlet and outlet ports, means providing an outwardly facing valve seat at the inlet end of the bore, a valve stem having an outwardly opening valve cooperable with the valve seat, an annular piston in said bore and surrounding the valve stem, a spring surrounding the valve stem and compressed between the valve stem and the piston, manually operable means cooperable with the stem to open the valve, means on the valve stem to limit the extent of movement of the piston relative to the stem in the direction of lubricant flow, and stop means fixed relative to the body to limit the extent of movement of the piston in the opposite direction.

4. The combination set forth in claim 3, in which there is a bypass passageway around the piston of sufficiently low resistance to lubricant flow that the piston will return to abut against the stop means, under the force applied by the spring, in a time interval in the order of one second.

5. The combination set forth in claim 3, in which cooperating dashpot parts are formed on the piston and valve stem to cushion the engagement of the piston with the movement limiting means on the valve stem.

6. A control valve for lubricating apparatus comprising a body having a bore and inlet and outlet connections communicating with the ends of the bore, a valve seat at the inlet end of the bore, a valve cooperable with the seat and opening in a direction opposed to the flow of lubricant from the inlet connection to the outlet connection, a valve stem secured to the valve and having a part extending through the body at the outlet end of the bore, an annular piston slidable on said stem and having a loose sliding fit within the bore, a spring compressed between the valve stem and the piston and urging the valve to closed position while urging the piston toward the inlet end of the bore, and manually operable means engaging the part of the valve stem extending through the body for moving the valve stem inwardly against the force of the spring and thereby move the valve from its seat.

7. A control valve for delivering individual measured charges of lubricant, comprising an inlet conduit for receiving lubricant under pressure, an outlet conduit, charge measuring means interposed between the conduits to prevent direct communication between them including means forming a measuring chamber and a piston reciprocable in the chamber, a valve to control communication through one of the conduits, manually operable means for opening the valve to move the piston to discharge lubricant from the chamber into the outlet conduit, means operable by the piston at the end of its discharging movement for urging the valve toward closed position, means to return the piston after the valve is closed, and means providing communication between opposite sides of the piston during its return movement for recharging the measuring chamber.

ERNEST W. DAVIS.

REFERENCES CITED

The following references are of record in the file of this patent:

UNITED STATES PATENTS

| Number | Name | Date |
|---|---|---|
| 212,800 | Hupfel | Mar. 4, 1879 |
| 805,498 | Stewart | Nov. 28, 1905 |
| 1,467,454 | Rood | Sept. 11, 1923 |
| 1,764,823 | Bowlus | June 17, 1930 |